June 28, 1955   N. LANGER   2,711,781
HEAT SEALING MACHINE AND METHOD
Filed March 6, 1953   2 Sheets-Sheet 1
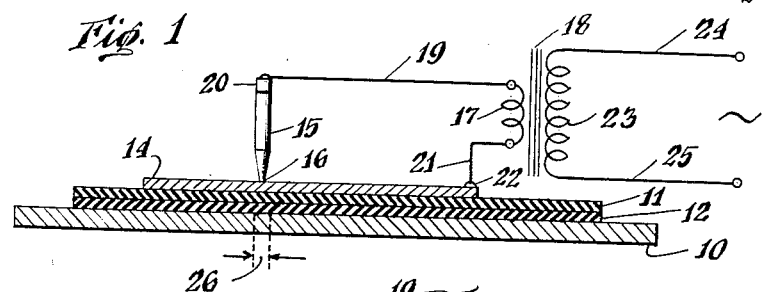
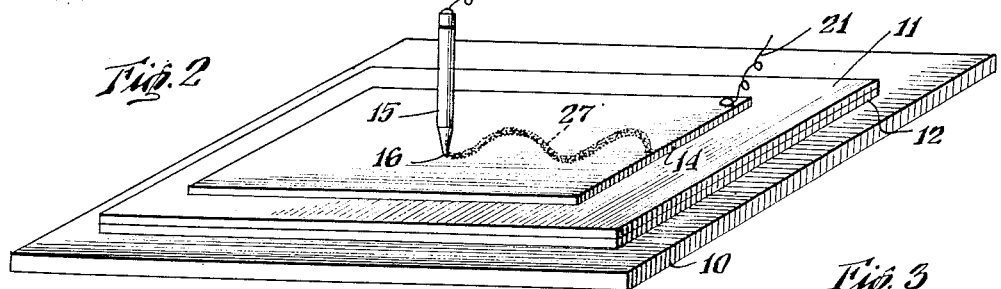
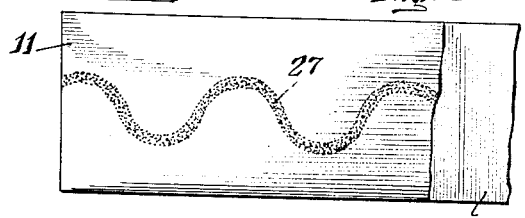
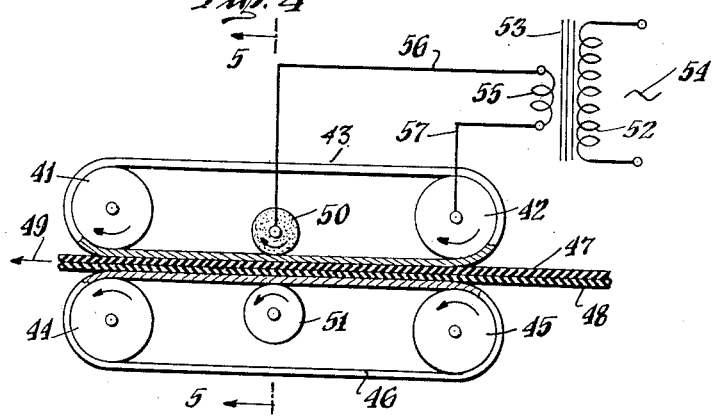
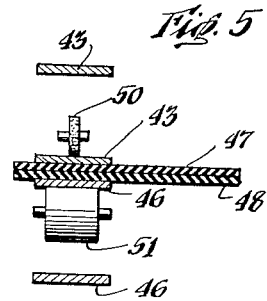
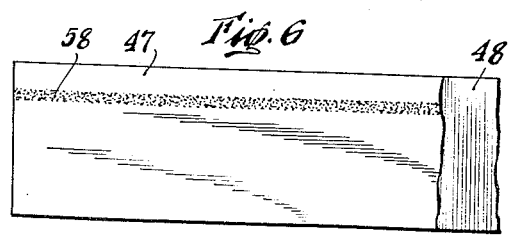
INVENTOR.
Nicholas Langer June 28, 1955   N. LANGER   2,711,781
HEAT SEALING MACHINE AND METHOD
Filed March 6, 1953   2 Sheets-Sheet 2
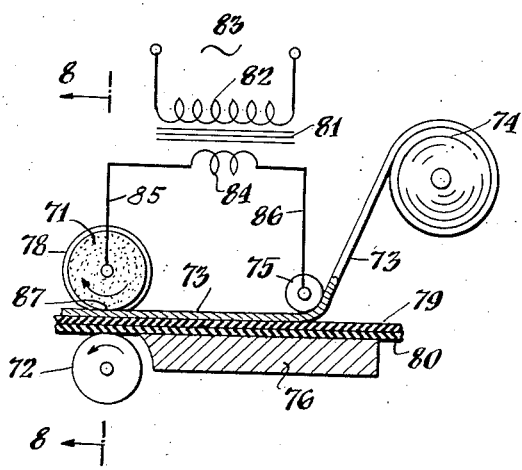
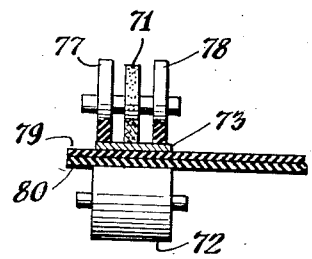
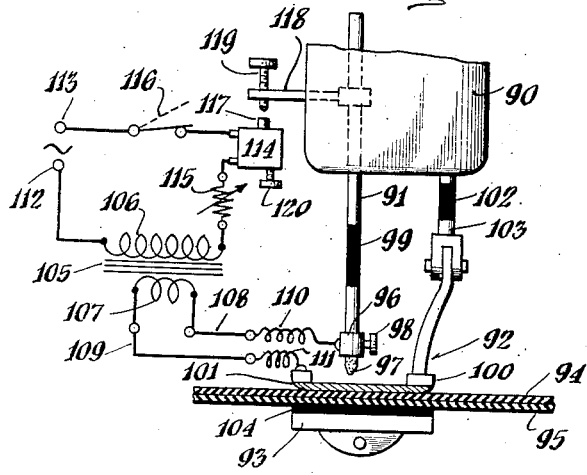
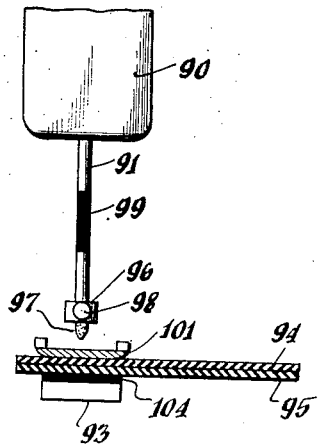
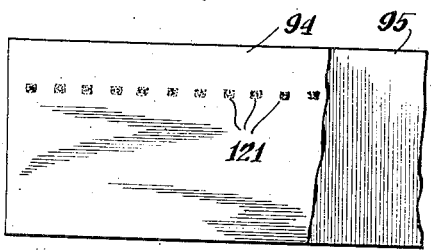
INVENTOR.
Nicholas Langer

United States Patent Office 2,711,781
Patented June 28, 1955

2,711,781

HEAT SEALING MACHINE AND METHOD

Nicholas Langer, New York, N. Y.

Application March 6, 1953, Serial No. 340,875

24 Claims. (Cl. 154—42)

This invention relates to the art of heat sealing, and, more particularly, to a machine and method of heat sealing or bonding layers or sheets of thermoplastic material.

In recent years various machines have been introduced for bonding together layers or plies of thermoplastic material by electrostatic heating of the material in a high frequency field. The operation of these machines is based on passing the superposed plies of the thermoplastic material through the space between a pair of electrodes connected to a source of radio frequency energy, the displacement of such plies being effected in a step-by-step or discontinuous manner, such as in a conventional sewing machine, or in a continuous manner, such as by means of a pair of feed rolls. The powerful high frequency field produced in the electrode zone will heat up the plies of the material passing therethrough to their bonding temperature, causing sealing or bonding of such plies as a result of the joint effect of heat and electrode pressure.

While electrostatic bonding machines of the described character, sometimes referred to in the industry as "electronic sewing machines," have been used for some years on a rather limited scale, their use on a large scale in the quantity production of articles formed from thermoplastic sheet material was greatly handicapped and in many cases was completely prevented by a combination of the following factors:

(1) The operation of conventional electronic sewing machines is based on the heat produced in the material as a result of dielectric losses in a high frequency field. This introduces certain inherent limitations as to the types of thermoplastic materials which may be successfully bonded and obviously excludes such materials in which the dielectric losses are very low. It so happens that there are various materials, such as particularly polyethylene, which are characterized by an extremely low loss factor, although they are quite desirable for other reasons, such as low cost, high strength, chemical inertness, low gas permeability, and the like.

(2) In view of the extremely high frequencies used in electrostatic bonding machines, serious problems are introduced in connection with impedance matching, in controlling the amount of heat generated in the plies, etc. Even very minute and frequently unavoidable variations in the composition and thickness of the plies or in the rate feeding the plies past the electrodes may prevent the production of uniformly sound seals or bonds.

(3) The amount of high frequency energy required is quite considerable and the equipment for generating such energy is bulky and also expensive to build and to operate. As a result, the initial cost of these electrostatic bonding machines is quite high and their commercial use is profitable only in extreme cases where no other method of bonding will serve.

I have discovered that the outstanding problem may be solved and the foregoing disadvantages may be eliminated in a remarkably simple manner.

It is an object of the present invention to improve electronic bonding machines.

It is another object of the present invention to provide a novel and improved electronic bonding machine and method of the thermal impulse type.

It is a further object of the present invention to provide a novel machine and method for heat sealing or bonding together plies of thermoplastic sheet material in which the sealing or bonding heat is generated by the contact resistance between a thin layer of electrically conducting material and an electrode of relatively small surface area.

It is also within the contemplation of the invention to provide an electronic bonding machine which does not require any high frequency currents for its operation but may directly be operated with alternating currents of commercial power line frequency.

The invention also contemplates an electronic bonding machine which is simple and inexpensive to construct and to operate and which may be maunfactured and sold at a fraction of the cost of conventional bonding machines of the high frequency type.

Other and further objects and advantages of the invention will become apparent from the following description, taken in conjunction with the accompanying drawings, in which:

Fig. 1 is a vertical sectional view, somewhat diagrammatic and fragmentary in character, of an electronic bonding machine embodying the principles of the invention;

Fig. 2 is a perspective view illustrating the operation of the machine shown in Fig. 1 in carrying out the method of the present invention;

Fig. 3 is a fragmentary top plan view of two layers of thermoplastic sheet material bonded together by the machine shown in Figs. 1 and 2;

Fig. 4 is a side elevational view, having parts in section, of a modified embodiment of the present invention;

Fig. 5 is a section taken on line 5—5 of Fig. 4;

Fig. 6 is a fragmentary top plan view of two layers of thermoplastic sheet material bonded together by the machine shown in Figs. 4 and 5;

Fig. 7 is a side elevational view, also diagrammatic and fragmentary in character and having parts in section of another modified embodiment of the present invention;

Fig. 8 is a section taken on line 8—8 of Fig. 7;

Fig. 9 is a fragmentary side elevation of a further embodiment of the invention into an electronic bonding machine of the reciprocating type;

Fig. 10 is a front view of a portion of the machine shown in Fig. 9; and

Fig. 11 is a fragmentary top plan view of two layers of thermoplastic sheet material bonded together by means of the apparatus shown in Figs. 9 and 10.

Broadly considered, in accordance with the principles of my invention, the layers or plies of thermoplastic sheet material to be bonded together are brought into face-to-face superposed position and an electrically conducting layer is placed thereon. This conducting layer is preferably constituted by a thin sheet of metal such as copper, aluminum, steel and the like although in many cases it is found advantageous to form the said layer of a metal having a relatively high specific resistance and good resistance to oxidation such as stainless steel or a suitable nickel-chromium alloy known under the name Nichrome. An electrode of relatively small surface area in the form of a pointed rod or of a small wheel is brought into contact with the exposed surface of this metal layer and an electric current of suitable intensity is passed through the circuit constituted by the electrode and the metal layer.

Due to the fact that the area of contact between the electrode and the thin metal layer is characterized by a relatively high resistance, upon completion of the electric circuit a considerable amount of heat will be generated in such area. This heat will be practically instantaneously transmitted through the thickness of the metal layer and will cause heating and bonding of the underlying thermoplastic layers in a corresponding area. To further promote and enhance this result, it is desirable to form the electrode of a material of relatively high specific resistance which is also capable of resisting the effect of heat and oxidation. Carbon is a material which is excellently suited for the purpose, preferably in the form of a compound of carbon or graphite particles with a suitable binder and in some cases a filler such as are used in the form of carbon brushes or for the purpose of electrodes in primary cells, arc lamps, and the like.

Of course, the method described may be carried out in a great variety of ways and the metal layer and the electrode may be provided in the form most suited for the particular method. Thus the electrode may be in the form of a pointed rod or wheel which may be reciprocated or rotated by suitable apparatus and the metal layer may be in the form of a single plate or in the form of an endless belt, as it will appear more fully as the description proceeds. Also, the metal layer may be provided in the form of a layer of metal foil which is permanently bonded or laminated with one of the thermoplastic layers to be heat sealed to another thermoplastic layer.

Referring now more particularly to Fig. 1 of the drawing, reference numeral 10 denotes a working plate or base which may be formed of any suitable material of an insulating or of an electrically conducting character. In most cases, however, it is advantageous to form the said base in the form of a thick and smooth-surfaced layer of a suitable elastomer, such as silicone rubber. Upon base plate 10 are placed the two layers or sheets of thermoplastic material 11 and 12. A thin metal layer 14, such as a thin sheet of Nichrome having a thickness between 0.001" and 0.005" is placed on the top surface of the thermoplastic layers.

An electrode 15 in the form of a rod of metal, but preferably of carbon, has its pointed end applied with moderate pressure against a point or small area of the metal layer 14, and an electric current of suitable intensity is passed through the circuit constituted by the electrode and the metal layer, including the area of contact between the said two elements denoted by numeral 16. As the current used is preferably of low voltage and of high intensity, this is best accomplished by connecting one end of the low voltage or secondary winding 17 of a step-down transformer 18 through a conductor 19 to a metal cap or clamp 20 at the upper end of the electrode 15, while the other end of the said winding is connected through a similar conductor 21 to the metal layer 14, as indicated at 22. Preferably, conductors 19 and 21 are long and flexible enough to permit displacing the electrode over the entire exposed surface of metal layer 14. Primary winding 23 of transformer 18 is connected to a source of alternating current, such as the usual 60 cycle power line through conductors 24 and 25.

From the foregoing description, the operation of this simplest embodiment of the invention will be readily understood by those skilled in the art. Upon closing the primary circuit of the transformer, a relatively heavy current will be caused to flow through the secondary circuit constituted by secondary winding 17, conductors 19 and 21, metal layer 14 and electrode 15, such circuit obviously also including the area of contact between the metal layer and the electrode indicated at 16. Since the electrical resistance of the contact area is relatively high, a considerable amount of heat will be generated therein. This heat will be practically instantaneously transmitted through the thickness of metal layer 14 and will cause heating of the directly underlying thermoplastic layers in an area 26 which is in exact correspondence with the contact area although it may be slightly larger due to the fact that the heat will "spread" to a moderate extent in the metal layer, depending on the thermal conductivity thereof and upon the speed with which the entire operation is carried out. As a result of the combined effect of heat and contact pressure, the thermoplastic layers will be bonded together in the heated area.

The operation of the machine, as just described, will produce a heat seal or bond in a single small area. In most cases, of course, sealing or bonding over a substantial continuous or discontinuous linear area or region is desired. This may be accomplished by maintaining the circuit closed and displacing the electrode over and in contact with the metal layer at a moderate speed. It will be found that the thermoplastic layers will be fused or bonded together in exact correspondence with the path described by the electrode point upon the exposed surface of the metal layer. This mode of operation will be best understood from Fig. 2 in which similar reference numerals have been used to denote corresponding parts. It will be noted that by displacing the point of electrode 15 on metal layer 14 along a sinuous path 27, the underlying thermoplastic layers will be heat sealed or bonded together along a corresponding path. Obviously, the apparatus and method just described permit the production of a bond between two or more layers of thermoplastic material along any desired configuration. In general, any pattern, however complex, may be formed without the slightest difficulty, including patterns which may cross over each other any number of times. Fig. 3 illustrates by way of example a pair of thermoplastic sheets 11 and 12 bonded together in accordance with the pattern 27 shown in Fig. 2.

The modified embodiment of the invention shown in Figs. 4 and 5 of the drawing is provided for the continuous formation of a linear bond or seam in layers of thermoplastic material at a high rate of speed. In these figures, reference numerals 41 and 42 denote a pair of rolls or drums between which there is tensioned an endless belt 43 of thin metal, such as Nichrome, stainless steel and the like. Numerals 44 and 45 denote another pair of similar rolls between which is tensioned another endless belt 46 of flexible sheet material. Belt 46 may also be formed of metal although in many cases it is preferred to make this belt of silicone rubber or of some other elastomer which has good surface adherence to the thermoplastic layers to be bonded together. Belts 43 and 46 are arranged in closely spaced parallel relation with respect to each other so that when a pair of superposed thermoplastic layers 47 and 48 are introduced therebetween and rolls 41, 42 and rolls 44, 45 are rotated by any suitable means (not shown) in opposite directions, the thermoplastic layers will be continuously advanced thereby in the direction of arrow 49.

A narrow sealing roll or wheel 50 is pressed against the top surface of metal belt 43 while a pressure roll 51 is applied in rolling contact with the lower surface of belt 46 so that the thicknesses of belt 43, thermoplastic layers 47 and 48 and of belt 46 are caused to pass through the bight of the said rolls. The system is energized by connecting primary winding 52 of a step-down transformer 53 to a source of alternating current 54. The secondary or low-voltage winding 55 of the said transformer has its ends connected to rolls 50 and 42 through conductors 56 and 57, respectively.

During operation of the machine, rolls 41, 42 and 44, 45 are rotated in opposite directions by any suitable mechanism, causing concurrent displacement of belts 43 and 46, with thermoplastic layers 47 and 48 therebetween, through the bight of sealing wheel or roll 50 and pressure roll 51. As the primary winding of transformer 53 is energized from alternating current source 54, a heavy current will be caused to flow through the secondary circuit comprising secondary winding 55, conductors 56 and 57, rolls 50 and 42, and the portion of endless metal belt 43 interposed between said rolls. Most of the heating effect of the secondary current will be concentrated in the area of contact between sealing wheel or roll 50 and the upper surface of belt 43 due to the fact that the resistance of the circuit is the highest in that particular area. To further increase the resistance in that area, it is preferred to provide the sealing wheel with a relatively narrow circumferential face, as this will best appear in Fig. 5 and to form the said wheel of a material of relatively high specific resistance, such as carbon or graphite.

The heat generated in the area of contact is quickly transformed by conduction through the moderate thickness of metal belt 43, causing heat sealing of the underlying thermoplastic layers 47 and 48, as a result of the combined effect of sealing heat generated therein and of the pressure applied thereto by rolls 50 and 51. As new portions of the thermoplastic layers are continuously passed through the sealing station constituted by the bight of rolls 50 and 51, a longitudinal sealed region or seam 58 will be formed in the layers as this will be readily observed in Fig. 6.

The modified embodiment of the invention shown in Figs. 7 and 8 is in many respects similar to the one just described except for the fact that, instead of an endless metal belt, a continuous length of thin metal foil is employed, equaling in length that of the thermoplastic layers to be bonded. This form of bonding apparatus essentially comprises a sealing wheel or roll 71 and a pressure roll 72 mounted for rotation in cooperating relation. A thin narrow strip or band 73 of metal foil, such as aluminum, copper, steel, and the like, is unwound from a supply roll 74 and is by means of a guide roll 75 and feed table 76 passed through the bight of rolls 71 and 72 together with underlying thermoplastic layers 79 and 80. As it will be best observed in Fig. 8, sealing wheel or roll 71 is relatively narrow and is formed of carbon, while rolls or wheels 77 and 78, one at each side of the sealing wheel, are formed of an elastomer, such as silicone rubber. The yielding character of rolls 77 and 78 will assure that metal foil 73 and the underlying thermoplastic layers 79, 80 will be positively guided in rolling contact with the pressure roll 72 while at the same time the circumferential surface of sealing roll 71 will be firmly pressed against the top surface of the layer of metal foil 73.

The electrical circuit of this modified embodiment of the invention comprises a step-down transformer 81 of which the primary winding 82 is connected to a source of alternating current 83. The secondary circuit comprises secondary winding 84 of the transformer, conductors 85 and 86, respectively connecting the ends of the secondary winding to sealing roll 71 and guide roll 75, and the portion of metal foil 73 interposed between the said walls. The secondary circuit is closed in itself and as most of its resistance is concentrated in the area of contact between sealing roll 71 and metal foil 73, as indicated at 87, a considerable amount of heat will be generated in said area. This heat will be transmitted by conduction through the thickness of metal foil 73, causing heat sealing of the underlying thermoplastic layers 79 and 80 in a corresponding area as a result of the combined effect of sealing heat and of the pressure prevailing between rolls 71 and 72.

Rotation of rolls 71 and 72 in opposite directions by any suitable mechanism (not shown), will progressively bring new portions of metal foil 73 in combination with underlying thermoplastic layers 79 and 80 into the sealing station constituted by the bight of rolls 71 and 72. Thus, a continuous longitudinal seam will be formed in the thermoplastic layers, similar to seam 58 shown in Fig. 6. After the sealing operation, the metal foil 73 covering the seam may be stripped off, if desired. Since the metal foil is preferably used only once, it is desirable to use a foil of such material and gauge as to keep the cost of this expendable element at a minimum. In this connection, however, it is to be noted that it is entirely feasible to roll up the metal foil after it has passed through the bight of rolls 71 and 72 and to reuse the same length of foil a number of times.

The principles of the present invention are particularly suitable for the construction of bonding machines wherein the layers to be bonded are displaced in a step-by-step or discontinuous manner, much in the same way as is the case in a conventional sewing machine. A bonding machine of this general type is shown in Figs. 9 and 10.

Referring now more particularly to Figs. 9 and 10 of the drawing, reference numeral 90 denotes the head of a suitable reciprocating mechanism, such as the one found in conventional sewing machines. This mechanism actuates a reciprocating bar 91 and a pressure foot 92 in predetermined sequence, the said pressure foot cooperating with a feed dog 93 to advance the layers 94 and 95 of thermoplastic material interposed therebetween. In view of the fact that the reciprocating mechanism and its cooperation with a bar, pressure foot and feed dog are well known to those skilled in the art, no detailed description thereof will be necessary.

The lower end of reciprocating bar 91 carries a metal socket or electrode holder 96. Into an axial recess of this holder there is inserted an electrode 97 in the form of a pointed cylindrical rod which is fixed in the holder by means of a set screw 98. It will be noted that electrode 97 and its holder 96 are electrically insulated from the rest of reciprocating bar 91 by the interposition of a piece of insulating material 99. Electrode 97 may be formed of any suitable material having good mechanical strength, a relatively high specific resistance and good resistance to oxidation. Carbon, graphite, tungsten or molybdenum are quite satisfactory for the purpose although it is entirely possible to use many other conducting materials, not excluding metals of high conductivity, such as silver, or silver alloys.

Pressure foot 92 comprises a rigid metal frame 100, to which there is welded or otherwise secured a thin layer of metal 101. This may be formed of Nichrome, stainless steel, tungsten, molybdenum, or the like. Metal layer 101 is insulated from the reciprocating mechanism by the interposition of a piece 102 of an electrical insulating material in its actuating rod 103.

The top or operating surface of feed dog 93 is covered with a layer 104 of a suitable elastomer, such as of silicone rubber, constituting a pressure member, the working face of which is arranged for cooperation with the lower face of metal layer 101 and as a result of its surface characteristics is adapted for frictional engagement with the lower one of layers 94 and 95 of the thermoplastic sheet material.

The electrical system of the machine comprises a step-down transformer 105, having a primary or high voltage winding 106 and a secondary or low voltage winding 107. The ends of secondary winding 107 are respectively connected to electrode 97 and frame 100 carrying metal layer 101 through lead wires 108 and 109 and through flexible conductors 110 and 111 so that such electrical connection is maintained during the reciprocation of electrode 97 and of pressure foot 92.

The primary winding 106 of transformer 105 has one of its ends directly connected to terminal 112 and its other end is connected to terminal 113 of a source of alternating current of commercial power line frequency through a time delay switch 114, rheostat 115, and an on-off switch 116. Actuating plunger 117 of time delay switch 114 is operable by means of an actuating rod 118, mounted on the upper portion of reciprocating bar 91. The time when operation of the time delay switch 114 is initiated during downward displacement of reciprocating bar 91 is adjustable by means of set screw 119 depending from the end of actuating rod 118 and the length of the period after which the said switch is automatically disabled or opened is adjustable by means of screw 120. In view of the fact that time delay switches of various types adaptable to the purposes of the present invention are well known to those skilled in the art, the said switch has been merely diagrammatically indicated in the drawing. For a detailed description of such switches reference may be had, for example, to my Patents 2,460,460 and 2,479,375.

From the foregoing description, the operation of the bonding machine of the invention will be readily understood by those skilled in the art.

When beginning the bonding operation, the layers 94 and 95 of the thermoplastic sheet material to be bonded together are placed in face-to-face position on layer 104 of feed dog 93 and pressure foot 92 is manually set into its operative position, holding the said layers confined or compressed between metal layer 101 and elastic layer 104. The bonding machine is now ready for automatic operation by actuating the driving means including an electric motor and the various mechanical devices driven thereby whereby reciprocating bar 91, pressure foot 92 and feed dog 93 are operated in properly timed sequence in a manner similar to the operation of a conventional power-driven sewing machine. During this automatic operation, the following steps are carried out cyclically and in very rapid succession:

1. Pressure foot 92 is lowered to confine thermoplastic layers 94 and 95 between metal layer 101 and surface 104 of feed dog 93.

2. Reciprocating bar 91 is lowered, thereby pressing the pointed end of electrode 97 against the upper surface of metal layer 101 carried by frame 100 of the pressure foot. This completes the secondary circuit of the transformer.

3. Shortly before, coincidentally with, or preferably immediately after electrode 97 has reached its contacting and pressure applying position with respect to metal layer 101, set screw 119 will be displaced downwardly by means of actuating rod 118, concurrently with the downward displacement of reciprocating rod 91 and the said set screw will strike against actuating plunger 117 of time delay switch 114.

4. Operation of the time delay switch 114 is initiated, the said switch being of the type which closes an electric circuit at once and opens the said circuit automatically, after a predetermined and adjustable time delay period.

5. The primary circuit, including terminal 113 of the alternating current power line, main switch 116, time delay switch 114, rheostat 115, primary winding 106, and terminal 112 of the power line is now energized. This will induce a low-voltage, high-intensity current in the secondary circuit comprising secondary winding 107, conductors 108, 109, 110, 111, electrode 97 and metal layer 101, including the relatively small area of contact between the pointed end of said electrode and the surface of said metal layer.

6. The heavy current flowing through the secondary circuit will quickly heat the said area of contact to a relatively high temperature due to the fact that most of the resistance of the circuit is concentrated in said area. This temperature is reached practically instantaneously, due to the very low heat capacity of the thin metal layer in the contact area. The heat thus produced is rapidly conducted through the thickness of metal layer 101 into a corresponding region of the underlying thermoplastic layers 94 and 95. As a result of the combined effect of the heat and pressure, a "stitch" is formed in the said region, this term being intended to mean a unitary area or spot wherein the thermoplastic layers are permanently bonded or fused together.

7. Immediately upon the said "stitch" being completed, the time delay switch 114 will automatically open the primary circuit and thus will also deenergize the secondary circuit. However, the pressure of metal layer 101 on the "stitch" is maintained for a short predetermined period thereafter, in order to permit the "stitch" to cool and to consolidate under pressure, thereby developing the full strength of the bond.

8. Reciprocating rod 91 is now raised, lifting up electrode 97 from metal layer 101.

9. Feed dog 93 is actuated, its operative surface 104 engaging with some friction the lower face of thermoplastic layer 95, thereby advancing a new length of layers 94 and 95 into "stitch"-forming position, whereupon the entire cycle is repeated over and over again so long as the machine is maintained in operation and is supplied with films of thermoplastic material.

Fig. 11 shows the thermoplastic layers 94 and 95 bonded together by the reciprocatory bonding machine of the invention. It will be noted that the external appearance of the bonded product is not unlike to that of a pair of layers stitched together by means of a conventional sewing machine. However, the actual bond between the layers is formed by fusion of the layers in uniformly spaced individual areas 121 and not by the locking effect of a thread. While in Fig. 11 the line of fusion bond is in the form of a succession of spaced "stitches," such unit lengths of fusion bond is in the form of a succession of spaced "stitches," such unit lengths of fusion bond may be caused to merge into each other by appropriate control of the bonding cycle, particularly by making the unit length by which the materials are advanced after each "stitch" less than the length that is bonded together during each bonding cycle. This will cause the successive "stitches" to overlap and to merge into each other. To further facilitate this merging effect, it is in some cases advantageous to replace the pointed electrode with an electrode having a wedge-shaped end, the width of the wedge being arranged in the direction in which the thermoplastic layers to be bonded are displaced.

The machines and methods of the invention are suitable for bonding layers of all types of thermoplastic material, such as Pliofilm (rubber hydrochloride), Vinylite (a copolymer of vinyl chloride and vinyl acetate), Polythene (polyethylene), Saran (vinylidene chloride), and the like. While the invention has been described and illustrated with particular reference to bonding together two plies of thermoplastic material, they are obviously applicable with equal or similar results to the bonding of three or more plies of such materials.

What is claimed is:

1. The method of heat sealing layers of thermoplastic material which comprises confining the thermoplastic layers between one surface of an electrically conducting layer and a backing surface, applying an electrode to a small area of the other surface of said conducting layer, and passing electric current through the circuit constituted by said electrode and the conducting layer to cause the generation of sealing heat in the area of contact without the generation of sealing heat in the remainder of said conducting layer thereby to effect heat sealing of the underlying thermoplastic layers in a corresponding area by said sealing heat transmitted from said area of contact to said thermoplastic layers through the thickness of said conducting layer.

2. The method of heat sealing layers of thermoplastic material which comprises confining the thermoplastic layers between one surface of a metal layer and a backing surface, applying an electrode to a relatively small area of the other surface of said metal layer, and providing a difference in electric potential between said electrode and said metal layer thereby to cause current to flow through the area of contact and heat sealing of the underlying thermoplastic layers in a corresponding area as a result of the heat generated in said area of contact and transmitted from said area of contact to said thermoplastic layers through the thickness of said metal layer while the remainder of said metal layer is maintained below heat sealing temperatures.

3. The method of heat sealing layers of thermoplastic material which comprises superposing an electrically conducting layer on the thermoplastic layers, applying an electrode to a small area of the exposed surface of said conducting layer, and passing electric current through the circuit constituted by said electrode and the conducting layer thereby to heat the area of contact therebetween and heat sealing of the underlying thermoplastic layers in a corresponding area by heat transmitted from said area of contact to the thermoplastic layers through the thickness of said conducting layer while maintaining the remainder of said conducting layer below heat sealing temperatures.

4. The method of heat sealing layers of thermoplastic material which comprises superposing a metal layer on the thermoplastic layers, bringing an electrode of small area into contact with the surface of the metal layer, and causing relative displacement of said electrode with respect to said metal layer while passing an electric current through the area of contact thereby sequentially causing the generation of heat in the path described by the area of contact of said electrode and heat sealing of the underlying thermoplastic layers along a corresponding path by heat transmitted from said area of contact to the thermoplastic layers through the thickness of said metal layer while maintaining the remainder of said metal layer below heat sealing temperatures.

5. The method of heat sealing layers of thermoplastic material which comprises interposing the thermoplastic layers between a relatively thin metal layer and a layer of backing material, bringing an electrode of small area and having an electrical conductivity lower than that of said metal layer in pressure contact with the exposed surface of said metal layer, and displacing the area of contact while passing an electric current through said area thereby sequentially causing the generation of heat in the path described by said displaced area and heat sealing of the underlying thermoplastic layers along a corresponding path by heat transmitted from said area of contact to the thermoplastic layers through the thickness of said metal layer while maintaining the remainder of said metal layer below heat sealing temperatures.

6. The method of heat sealing layers of thermoplastic material which comprises interposing the thermoplastic layers between a flexible metal layer and an elastic backing layer, bringing an electrode of small area into pressure contact with the surface of the metal layer, and causing relative displacement of said electrode with respect to said metal layer while passing an electric current through the area of contact thereby sequentially causing the generation of heat in the path described by the area of contact of said electrode and heat sealing of the underlying thermoplastic layers along a corresponding path by heat transmitted from said area of contact to said thermoplastic layers through the thickness of said metal layer while maintaining the remainder of said metal layer below heat sealing temperatures.

7. The method of heat sealing layers of thermoplastic material which comprises interposing the thermoplastic layers between a metal layer and backing layer, bringing an electrode of small area into contact with the surface of the metal layer, producing relative displacement of said electrode with respect to said metal layer while passing an electric current through the area of contact thereby sequentially generating heat in the path described by the area of contact of said electrode and heat sealing of the underlying thermoplastic layers along a corresponding path by heat transmitted from said area of contact to said thermoplastic layers through the thickness of said metal layer while maintaining the remainder of said metal layer below heat sealing temperatures, and then separating the heat sealed thermoplastic layers from said metal layer and said backing layer.

8. The method of heat sealing layers of thermoplastic material at least one of which has a thin layer of metal permanently bonded thereto which comprises bringing the thermoplastic layers into face-to-face superposed position with the metal layer exposed; bringing an electrode of relatively small area into contact with the exposed surface of the metal layer, and causing relative displacement of said electrode with respect to said metal layer while passing an electric current through the area of contact thereby sequentially generating heat in the path described by the area of contact of said electrode and heat sealing of the underlying thermoplastic layers along a corresponding path by heat transmitted from said area of contact to said thermoplastic layers through the thickness of said metal layer while maintaining the remainder of said metal layer below heat sealing temperatures.

9. The method of heat sealing layers of thermoplastic material which comprises continuously displacing the thermoplastic layers in combination with a superposed metal layer through a sealing station constituted by an electrode surface of small area and a backing surface so that the electrode is in contact with said metal layer, passing an electric current through the area of contact thereby sequentially generating heat in the path described by the area of contact of said electrode and heat sealing the underlying thermoplastic layers along a corresponding path by heat transmitted from said area of contact to said thermoplastic layers through the thickness of said metal layer while maintaining the remainder of said metal layer below heat sealing temperatures, and then separating said metal layer from the heat sealed thermoplastic layers.

10. The method of heat sealing layers of thermoplastic material which comprises superposing a metal layer upon the thermoplastic layers, displacing the superposed layers through the bight of an electrode roll and a pressure roll with the circumferential surface of said electrode roll in rolling pressure contact with the exposed surface of the metal layer, passing an electric current through the area of contact thereby sequentially causing the generation of heat in the path described by the area of contact of said electrode roll and heat sealing of the underlying thermoplastic layers along a corresponding path by heat transmitted from said area of contact to said thermoplastic layers through the thickness of said metal layer while maintaining the remainder of said metal layer below heat sealing temperatures, and continuously separating said metal layer from the heat sealed thermoplastic layers.

11. The method of heat sealing layers of thermoplastic material which comprises displacing the thermoplastic layers in combination with a thin metal layer, bringing an electrode of small area into transient reciprocatory contact with the exposed surface of the metal layer during such displacement, and passing an electric current through the circuit constituted by said electrode and said metal layer during at least a portion of the period while said circuit is closed thereby to cause the generation of heat in the area of contact and the formation of spaced bonded areas in the thermoplastic layers by heat transmitted from said area of contact to said thermoplastic layers through the thickness of said metal layer while maintaining the remainder of said metal layer below heat sealing temperatures.

12. The method of heat sealing layers of thermoplastic material which comprises displacing the thermoplastic layers with respect to a thin metal layer, bringing an electrode of small area into transient reciprocatory contact with the exposed surface of the metal layer during such displacement, and passing an electric current through the area of contact during at least a portion of the period while such contact exists thereby to cause the practically instantaneous generation of heat in the area of contact and the formation of spaced stitch-simulating bonded areas in the underlying thermoplastic layers by heat transmitted from said area of contact to said thermoplastic layers through the thickness of said metal layer while maintaining the remainder of said metal layer below heat sealing temperatures.

13. The method of heat sealing layers of thermoplastic material which comprises confining a linear region of limited length of the layers between a thin metal layer and a backing layer, bringing an electrode of small area into contact with the exposed surface of the metal layer, passing an electric current through the area of contact during at least a portion of the period while such contact exists thereby to cause the practically instantaneous generation of heat in the area of contact and the formation of a corresponding stitch-simulating bonded area in the thermoplastic layers by heat transmitted from said area of contact to said thermoplastic layers through the thickness of said metal layer while maintaining the remainder of said metal layer below heat sealing temperatures, and then advancing a new region of the thermoplastic layers into confined relation with said metal and backing layers and repeating thereon the same procedure.

14. The method of heat sealing layers of thermoplastic material which comprises compressing a linear region of limited length of the layers between a thin metal layer and a backing layer, bringing an electrode of small area into contact with the exposed surface of the metal layer, passing a pulse of electric current through the circuit constituted by said electrode and said metal layer thereby to cause the generation of heat in the area of contact and bonding of the thermoplastic layers in a corresponding area by heat transmitted from said area of contact to said thermoplastic layers through the thickness of said metal layer while maintaining the remainder of said metal layer below heat sealing temperatures, maintaining the compression on said area after the end of said pulse for a period sufficient to have the bonded area to consolidate, and then discontinuing said compression and advancing a new region of the thermoplastic layers into cooperating relation with said metal and backing layers.

15. A machine for heat sealing layers of thermoplastic material comprising, in combination, a thin metal layer and a backing layer between which the thermoplastic layers may be compressed, an electrode of small area adapted to be brought into contact with said metal layer, and means for passing an electric current through the circuit constituted by said electrode and said metal layer, the respective electrical resistances of said circuit constituents being so determined as to cause the generation of sealing heat solely in said area of contact and heat sealing of the thermoplastic layers in a corresponding area by heat transmitted from said area of contact to said thermoplastic layers through the thickness of said metal layer.

16. A machine for heat sealing layers of thermoplastic material comprising, in combination, a thin metal plate and a backing plate between which the thermoplastic layers may be interposed, an electrode of small area adapted to be brought into contact with a restricted area of the exposed surface of the metal plate, means for causing relative displacement of said electrode with respect to said metal plate, and means for passing an electric current through the circuit constituted by said metal plate and said electrode including said area of contact during said displacement, the respective electrical resistances of said circuit constituents being so determined as to cause the generation of sealing heat solely in said area of contact and heat sealing of the thermoplastic layers in a corresponding area by heat transmitted from said area of contact to said thermoplastic layers through the thickness of said metal plate.

17. A machine for heat sealing layers of thermoplastic material comprising, in combination, a thin metal plate and a backing plate between which the thermoplastic layers may be interposed, an electrode of small area and having an electrical conductivity substantially lower than that of said metal plate adapted to be brought into pressure contact with a restricted area of the exposed surface of the metal plate, means for causing relative displacement of said electrode and of said metal plate with respect to each other, and means for passing an electric current through said area of contact thereby sequentially causing the generation of sealing heat solely in the path described by said displaced area of contact and heat sealing of the thermoplastic layers along a corresponding path by heat transmitted from said area of contact to said thermoplastic layers through the thickness of said metal plate.

18. A machine for heat sealing layers of thermoplastic material comprising, in combination, an electrode roll and a pressure roll, means for displacing the thermoplastic layers to be sealed in combination with a superposed thin metal layer through the bight of said rolls with the electrode roll in contact with the exposed surface of the metal layer, and means for passing an electric current through the area of contact thereby to generate sealing heat solely in said area and to continuously heat seal the thermoplastic layers along the path described by said area by heat transmitted from said area of contact to said thermoplastic layers through the thickness of said metal layer.

19. A machine for heat sealing layers of thermoplastic material comprising, in combination, an electrode roll having a relatively small circumferential surface and a pressure roll, means for continuously moving an endless belt of flexible metal through the bight of said rolls in contact with the circumference of said electrode roll, means for displacing the thermoplastic layers in contact with said metal belt and said pressure roll, and a source of electric current connected between said electrode roll and said metal belt to cause current to flow through and the generation of sealing heat solely in the area of contact and heat sealing of the thermoplastic layers in a path corresponding to the displacement of said area by heat transmitted from said area of contact to said thermoplastic layers through the thickness of said metal belt.

20. A machine for heat sealing layers of thermoplastic material comprising, in combination, an electrode roll and a pressure roll, means for continuously feeding the layers to be sealed in combination with a superposed thin and flexible metal layer through the bight of said rolls so as to have the circumferential surface of the electrode roll in rolling pressure contact with the exposed surface of the metal layer, and means for passing an electric current through the area of contact between said electrode roll and said metal layer thereby to cause the generation of sealing heat solely in such area and the continuous formation of a longitudinal seam in the underlying thermoplastic layers as a result of said sealing heat being transmitted from said area of contact to said thermoplastic layers through the thickness of said metal layer.

21. A machine for heat sealing layers of thermoplastic material comprising, in combination, an electrode roll having a relatively small circumferential surface and a pressure roll, a feeding and guiding mechanism for continuously displacing the thermoplastic layers to be sealed in combination with a superposed strip of metal foil through the bight of said rolls so as to have the circumferential surface of the electrode in rolling pressure contact with the exposed surface of the metal foil, and means for passing an electric current through the circuit constituted by said electrode roll and a portion of said foil including the continuously displaced area of contact therebetween thereby to cause the generation of sealing heat solely in such area and the progressive formation of a longitudinal seam in the underlying thermoplastic layers as a result of said sealing heat being transmitted from said area of contact to said thermoplastic layers through the thickness of said metal foil.

22. A machine for heat sealing layers of thermoplastic material comprising, in combination, an electrode member and a pressure member including a metal layer, means for causing relative reciprocation of said members to periodically bring said electrode in contact with one face of said metal layer, means for progressively feeding the layers to be heat sealed into contacting relation with the other face of said metal layer, an actuating mechanism for said reciprocating means and for said feeding means to progressively advance further lengths of said thermoplastic layers into cooperating relation with said metal layer, a circuit for passing an electric current through the area of contact of said electrode and said metal layer, and a switching mechanism operable in timed relation with the operation of said actuating mechanism for closing said circuit during at least a portion of the period while said electrode is in contact with said metal layer thereby to cause the generation of sealing heat solely in the area of contact and heat sealing of the underlying thermoplastic layers in a corresponding area by transmission of said sealing heat from said area of contact to said thermoplastic layers through the thickness of said metal layer.

23. A machine for heat sealing layers of thermoplastic material comprising, in combination, an electrode member, a pressure member comprising a metal layer, means for reciprocating said members to periodically bring said electrode member into contact with one face of said metal layer, means for discontinuously advancing the layers to be heat sealed into contacting relation with the other face of said metal layer, an energizing circuit including a switch adapted when actuated to pass heating current through the area of contact between said electrode member and said metal layer, and an actuating mechanism for operating said reciprocating means, said advancing means and said switching means in such predetermined sequence as to progressively advance further unit lengths of said thermoplastic layers into sealing relation with said metal layer and to cause heat sealing of such unit lengths by the sealing heat generated solely in the area of contact between said electrode member and said metal layer and transmitted from said area of contact to said thermoplastic layers through the thickness of said metal layer.

24. A machine for heat sealing plies of thermoplastic material comprising, in combination, a first pressure member comprising an electrode, a second pressure member comprising a metal layer mounted for cooperation therewith, means for reciprocating said members for alternately bringing said electrode into contacting relation with one face of said metal layer and to apply pressure upon a pair of plies of thermoplastic material by the other face of said metal layer, a switching mechanism operable in the pressure-applying position of said members to interpose said electrode and said metal layer into an electrical circuit for a predetermined period thereby to cause the generation of sealing heat solely in the area of contact between said electrode and one face of said metal layer and bonding of the plies that are in pressure contact with the other face of said metal layer in a corresponding area by heat transmitted from said area of contact to said plies through the thickness of said metal layer, feeding means operable after the end of said period for discontinuously advancing further unit lengths of the plies into cooperating relation with said members, and an operating mechanism for actuating said reciprocating means, said switching mechanism and said feeding means in such predetermined sequence that the period of pressure application upon said plies extends beyond the period of heat application to such plies.

References Cited in the file of this patent

UNITED STATES PATENTS

| | | |
|---|---|---|
| 2,302,024 | Goss | Nov. 17, 1942 |
| 2,525,356 | Hoyler | Oct. 10, 1950 |
| 2,556,008 | Spalding | June 5, 1951 |
| 2,589,777 | Collins | Mar. 18, 1952 |
| 2,627,893 | Williams | Feb. 10, 1953 |
| 2,633,443 | Langer | Mar. 31, 1953 |
| 2,640,488 | Welch | June 2, 1953 |
| 2,640,798 | Langer | June 2, 1953 |